US011816826B2

(12) United States Patent
Moon et al.

(10) Patent No.: US 11,816,826 B2
(45) Date of Patent: Nov. 14, 2023

(54) IMAGE PROCESSING-BASED SYSTEM FOR MEASURING MOISTURE AND LIGHT TRANSMITTANCE AND METHOD FOR MEASURING MOISTURE AND LIGHT TRANSMITTANCE USING SAME

(71) Applicant: OSONG MEDICAL INNOVATION FOUNDATION, Cheongju-si (KR)

(72) Inventors: Jin Hee Moon, Sejong-si (KR); Young-Jin Kim, Cheongju-si (KR); Ha Chul Jung, Cheongju-si (KR); Da Hye Kwon, Bucheon-si (KR); Ha Na Park, Cheongju-si (KR); Song Woo Yoon, Cheongju-si (KR)

(73) Assignee: Osong Medical Innovation Foundation, Cheongju-si (KR)

( * ) Notice: Subject to any disclaimer, the term of this patent is extended or adjusted under 35 U.S.C. 154(b) by 497 days.

(21) Appl. No.: 17/270,225

(22) PCT Filed: Aug. 19, 2019

(86) PCT No.: PCT/KR2019/010463
§ 371 (c)(1),
(2) Date: Feb. 22, 2021

(87) PCT Pub. No.: WO2020/050518
PCT Pub. Date: Mar. 12, 2020

(65) Prior Publication Data
US 2021/0304394 A1 Sep. 30, 2021

(30) Foreign Application Priority Data
Sep. 3, 2018 (KR) .................. 10-2018-0104642

(51) Int. Cl.
*G06T 7/00* (2017.01)
*G06T 7/90* (2017.01)
(Continued)

(52) U.S. Cl.
CPC .............. *G06T 7/0004* (2013.01); *G06T 7/90* (2017.01); *H04N 23/56* (2023.01);
(Continued)

(58) Field of Classification Search
CPC ............... G06T 7/0004; G06T 7/90; G06T 2207/10024; G06T 2207/10056;
(Continued)

(56) References Cited

U.S. PATENT DOCUMENTS

| 4,823,595 A | * | 4/1989 | Hamed | ................ G01N 33/346 73/76 |
| 2004/0234119 A1 | * | 11/2004 | Lee | .......................... H05K 3/22 382/145 |

(Continued)

FOREIGN PATENT DOCUMENTS

| CN | 203396707 U | 1/2014 |
| JP | 11160222 A | 11/1997 |

(Continued)

OTHER PUBLICATIONS

European search report dated Jun. 15, 2022, for EP 19856697.
International search report dated Nov. 28, 2019, for PCT/KR2019/010463.

*Primary Examiner* — Aaron W Carter
(74) *Attorney, Agent, or Firm* — LeePI

(57) ABSTRACT

In an image processing-based system for measuring moisture and light transmittance and a method for measuring moisture and light transmittance using the same, the image processing-based system includes a coating paper, a photographing box, a microscope and an RGB decision program. The coating paper is coated with coating conditions substantially same as the coating conditions for a metal material. The photographing box is configured to photograph the coating paper, to obtain a first image. The microscope is configured to photograph the coating paper, to obtain a
(Continued)

second image. The RGB decision program is configured to obtaining an RGB value of each of the first and second images. Moisture transmittance is evaluated using the RGB value of the first image, and light transmittance is evaluated using the RGB value of the second image.

9 Claims, 6 Drawing Sheets

(51) Int. Cl.
  *H04N 23/56* (2023.01)
  *G01N 21/84* (2006.01)
(52) U.S. Cl.
  CPC ............... *G01N 2021/8427* (2013.01); *G06T 2207/10024* (2013.01); *G06T 2207/10056* (2013.01); *G06T 2207/30124* (2013.01)
(58) Field of Classification Search
  CPC .......... G06T 2207/30124; H04N 23/56; G01N 2021/8427; G01N 2021/8887; G01N 21/8851; G01N 2201/062
  See application file for complete search history.

(56) References Cited

U.S. PATENT DOCUMENTS

| | | | |
|---|---|---|---|
| 2008/0166268 A1* | 7/2008 | Yamaguchi | A61B 5/4272 422/400 |
| 2012/0224871 A1* | 9/2012 | Furuya | G03G 15/5029 399/45 |
| 2014/0285798 A1* | 9/2014 | Nishimura | G01J 3/26 356/300 |
| 2015/0357494 A1* | 12/2015 | Dean | B32B 27/28 428/425.9 |
| 2016/0282747 A1* | 9/2016 | Tsuchiya | G03G 15/0266 |
| 2018/0356221 A1* | 12/2018 | Kusumoto | B64U 10/13 |
| 2019/0127609 A1* | 5/2019 | Johnson | B32B 27/325 |
| 2019/0137918 A1* | 5/2019 | Matsuda | G03G 15/16 |
| 2019/0202373 A1* | 7/2019 | Kubota | H04N 13/246 |
| 2021/0304394 A1* | 9/2021 | Moon | G06T 7/0004 |

FOREIGN PATENT DOCUMENTS

| | | |
|---|---|---|
| JP | 2004-179190 A | 6/2004 |
| JP | 2006-313146 A | 11/2006 |
| JP | 2007-078663 A | 3/2007 |
| KR | 10-2004-0099590 A | 12/2004 |

* cited by examiner

IMAGE PROCESSING-BASED SYSTEM FOR MEASURING MOISTURE AND LIGHT TRANSMITTANCE AND METHOD FOR MEASURING MOISTURE AND LIGHT TRANSMITTANCE USING SAME

BACKGROUND

1. Field of Disclosure

The present disclosure of invention relates an image processing-based system for measuring moisture and light transmittance and a method for measuring moisture and light transmittance using the same, and more specifically the present inventions relates to an image processing-based system for measuring moisture and a method for measuring moisture and light transmittance using the same, so as to test and evaluate the performance of the coating.

2. Description of Related Technology

Generally, an electric circuit should be maintained with a proper humidity and a proper temperature, so as to be operated uniformly and stably. However, in relatively moist conditions, the electric circuit may be hard to be operated uniformly and stably. Thus, the coating processes may be necessary in manufacturing the electric circuit. In the coating processes, various processing conditions including a step of the processes, a processing time, a coating material, a thickness of the coating and so on, may be properly selected, and thus the evaluation or the testing of the coating processes or the results of the coating processes may be necessary.

Korean laid-open patent No. 10-2012-0014638 discloses the test apparatus testing whether a non-conductive coating layer is properly formed on a surface of the mobile device or not. In addition, Korean laid-open patent No. 10-2012-0063195 discloses the coating evaluation apparatus for pre-testing the coating performance of a coating material like a resin.

However, the technical feature disclosed in Korean laid-open patent No. 10-2012-0014638 is hard to test the performance of the coating when the coating layer is conductive, and the testing device disclosed in Korean laid-open patent No. 10-2012-0063195 is too big.

Regarded prior arts are, as mentioned above, Korean laid-open patent No. 10-2012-0014638 and Korean laid-open patent No. 10-2012-0063195.

SUMMARY

The present invention is developed to solve the above-mentioned problems of the related arts. The present invention provides an image processing-based system for measuring moisture capable of evaluating the performance of the coating fast and correctly.

In addition, the present invention also provides a method for measuring moisture and light transmittance using the image processing-based system.

According to an example embodiment, the image processing-based system for measuring moisture includes a coating paper, a photographing box, a microscope and an RGB decision program. The coating paper is coated with coating conditions substantially same as the coating conditions for a metal material. The photographing box is configured to photograph the coating paper, to obtain a first image. The microscope is configured to photograph the coating paper, to obtain a second image. The RGB decision program is configured to obtaining an RGB value of each of the first and second images.

Moisture transmittance may be evaluated using the RGB value of the first image, and light transmittance may be evaluated using the RGB value of the second image In an example, the coating paper may be a paper including cobalt chloride.

In an example, the photographing box may include a first box in which the coating paper is positioned at a center thereof, and a second box combined with the first box and configured to photograph the coating paper.

In an example, the first box may include an LED illumination device which is disposed on at least one surface of the first box and provides an LED light. The second box may include a photographing device disposed at a center thereof.

In an example, the RGB decision program may read the image by a pixel unit, and store the read image with divided into R, G and B values.

In an example, the RGB decision program may provide an RGB average value of an entire image, an RGB value of a click portion of the image, an RGB value of a dragged portion of the image, and an RGB average value of each of nine parts of the image including an upper portion, a lower portion, a left portion, a right portion, a central portion, and each four sides of the image.

In an example, the RGB decision program may have functions including a gradation function displaying the image with 10 pixel unit, a binary processing function processing the image into white and black colors using the RGB average value of the image, and an auto processing function processing a plurality of images in series.

According to an example embodiment, in a method for measuring moisture and light transmittance, a coating paper is coated with coating conditions substantially same as the coating conditions for a metal material. First and second images are obtained via photographing the coating paper. An RGB value of each of the first and second images is obtained using an RGB decision program. Moisture transmittance and light transmittance are evaluated using each of the RGB values of the first and second images.

In an example, in obtaining the first image, the coating paper may be positioned at a center of a photographing box.

In an example, in obtaining the second image, the coating paper may be photographed by a microscope.

According to the present example embodiments, the coating performance may be efficiently evaluated without using a relatively expensive device or a special analyzing service. The image processing-based system has a relatively simple structure, so that a cost price may be relatively low and an operating or a maintenance may be relatively easy or simple.

In addition, the coating performance may be evaluated via measuring moisture transmittance and light transmittance, so that the coating performance may be evaluated without actually coating a metal.

REFERENCE OF NUMERALS

Figure 1:
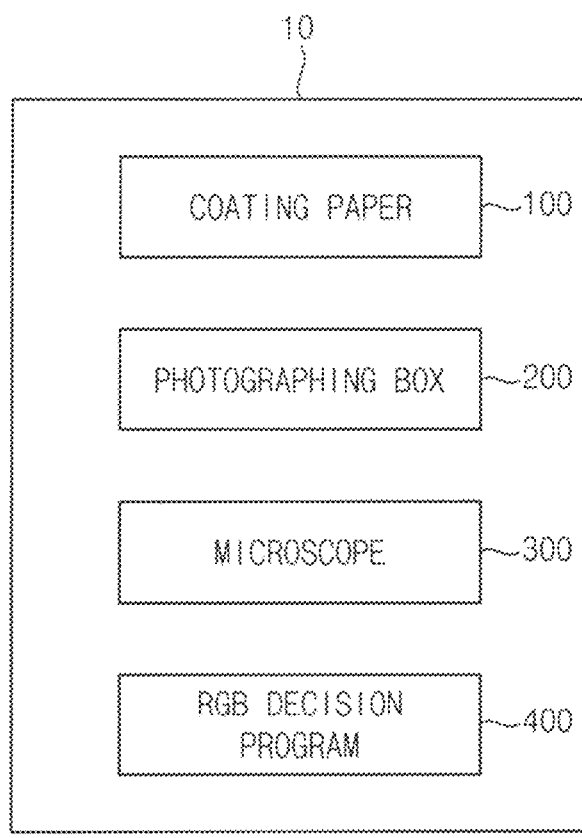
FIG. 1 is a block diagram illustrating an image processing-based system for measuring moisture and light transmittance according to an example embodiment of the present invention.

100: coating paper
200: photographing box
300: microscope
400: RGB decision program

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiment of the invention will be explained in detail with reference to the accompanying drawings.

Figure 2:
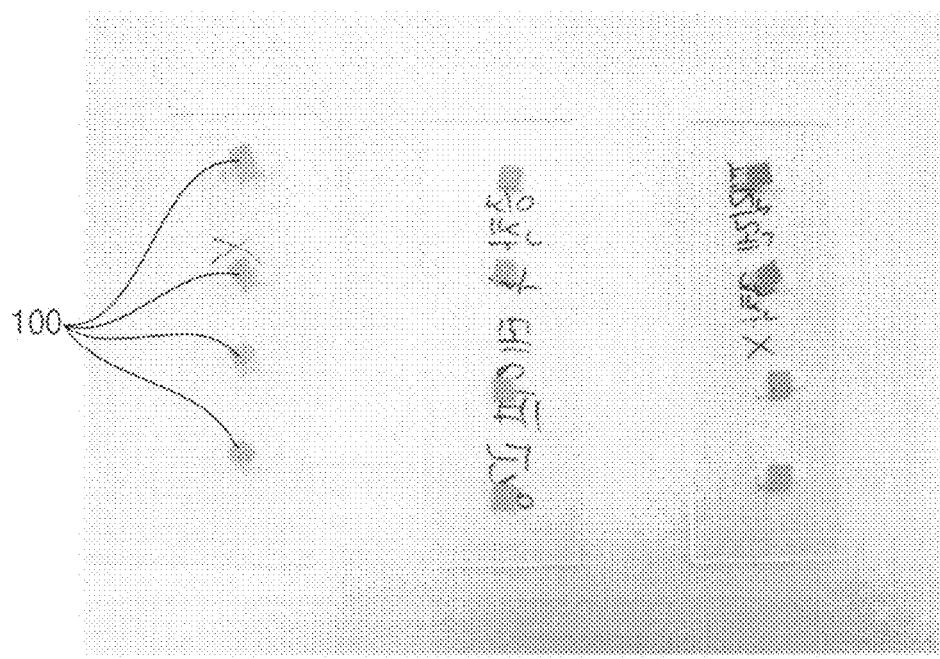
FIG. 2 is an image showing coating papers in the image processing-based system for measuring moisture and light transmittance of FIG. 1.
Figure 3:
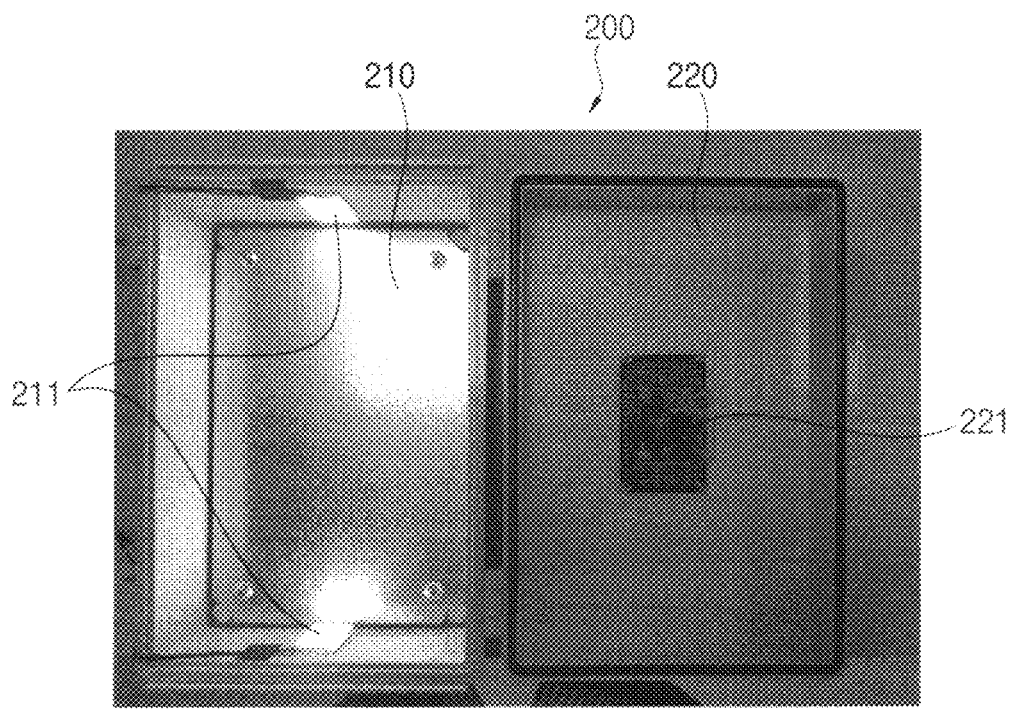
FIG. 3 is an image showing a photographing box in which moisture transmittance of the image processing-based system for measuring moisture and light transmittance of FIG. 1 is decided.
Figure 4:
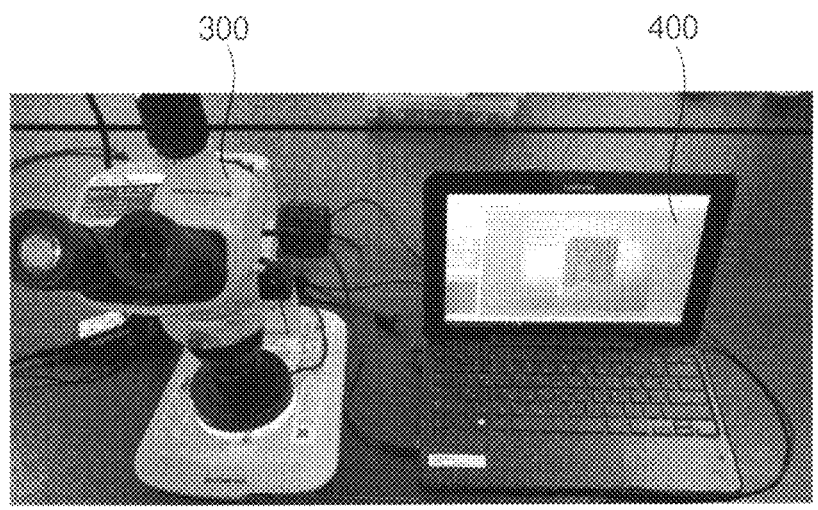
FIG. 4 is an image showing a coating paper photographed by a microscope for deciding light transmittance in the image processing-based system for measuring moisture and light transmittance of FIG. 1.

FIG. 1 is a block diagram illustrating an image processing-based system for measuring moisture and light transmittance according to an example embodiment of the present invention. FIG. 2 is an image showing coating papers in the image processing-based system for measuring moisture and light transmittance of FIG. 1. FIG. 3 is an image showing a photographing box in which moisture transmittance of the image processing-based system for measuring moisture and light transmittance of FIG. 1 is decided. FIG. 4 is an image showing a coating paper photographed by a microscope for deciding light transmittance in the image processing-based system for measuring moisture and light transmittance of FIG. 1.

Referring to FIG. 1, the image processing-based system for measuring moisture and light transmittance (hereinafter, image processing-based system) 10 according to the present example embodiment includes a coating paper 100 having a coating material, a photographing box 200, a microscope 300 and an RGB decision program 400.

In the image processing-based system 10, as illustrated in FIG. 2, the coating paper is coated with the coating material, and then the moisture transmittance and the light transmittance of the coating paper are measured. Thus, the coating performance may be evaluated, when the coating material is used to be coated on a metal which is used for an electric circuit.

Accordingly, the moisture transmittance and the light transmittance of the coating paper are measured via the image processing-based system 10 according to the present example embodiment, and thus the coating performance of the coating material which is coated on the metal may be correctly and simply evaluated, without actually coating the coating material on the metal. Thus, the image processing-based system 10 according to the present example embodiment may be used for a copy experiment for evaluating the coating performance.

To copy the coating performance, in the image processing-based system 10, the coating paper 100 is coated with coating conditions substantially same as the coating conditions for the metal material, and then the coating performance may be evaluated.

Here, the coating paper may be a paper including cobalt chloride.

The paper including cobalt chloride normally has a blue color, but when water makes contact with the cobalt chloride, the paper of cobalt chloride is changed to be a red color.

Thus, when the coating paper 100 is not properly coated and the coating paper 100 is soaked in water, a portion of the coating paper which is not coated may be changed into the red color, so that the coating performance may be detected. Here, the coating paper 100 is photographed and quantity or amount of discoloration (color-changed) portion is analyzed, and thus amount of water soaked into the coating paper may be calculated to evaluate the coating performance.

When the coating paper 100 is not properly coated and thus the color of the coating paper 100 is partially changed into the red, the coating paper 100 is positioned at a center of the photographing box 200 and then an image may be obtained on the coating paper 100. Thus, the coating performance of the coating paper 100 may be obtained via analyzing the image.

Here, the photographing box 200 photographs the coating paper 100 to obtain a first image. Using the first image, the amount of moisture of the coating paper 100 soaked in the water may be obtained. The photographing box 200 has a box shape in which a receiving space is formed, and as illustrated in FIG. 3, the photographing box 200 includes a first box 210 and a second box 220 combined with each other.

The first box 210 has a box shape with an opening formed at a front side, and the coating paper 100 is positioned at a center of the first box 210. An LED illumination device 211 is positioned on at least one inner surface of the first box 210, and thus when the coating paper 100 is photographed, an LED light is provided to the coating paper 100. Thus, the photograph on the coating paper 100 may be uniformly performed with constant surroundings.

The second box 210 also has a box shape substantially same as the first box 210, which means the second box 210 may have the opening formed at a front side. The second box 210 includes a photographing device 221 disposed at a center of the second box 210, for photographing the coating paper 100. After the second box 220 is combined with the first box 210, the photographing device 221 photographs the coating paper 100 positioned at the center of the first box 210, to obtain the first image.

Here, when the color of the coating paper 100 is changed due to the moisture, the first image is analyzed by the RGB decision program 400, which means that an RGB value is obtained from the first image using the RGB decision program 400, and then the amount of the discoloration of the coating paper 100 may be estimated.

Light transmittance may be changed according to the amount of the coating on the coating paper 100, and thus in the present example embodiment, the light transmittance is measured. The image (hereinafter, a second image) obtained via illuminating a light to the coating paper 100 is used for measuring intensity of illumination, and thus the light transmittance of the coating paper 100 may be evaluated.

Here, the second image may be obtained by the microscope 300, as illustrated in FIG. 4, and the RGB value may be obtained using the RGB decision program 400. Then, the light transmittance of the coating paper may be evaluated, based on the RGB value.

Figure 5:
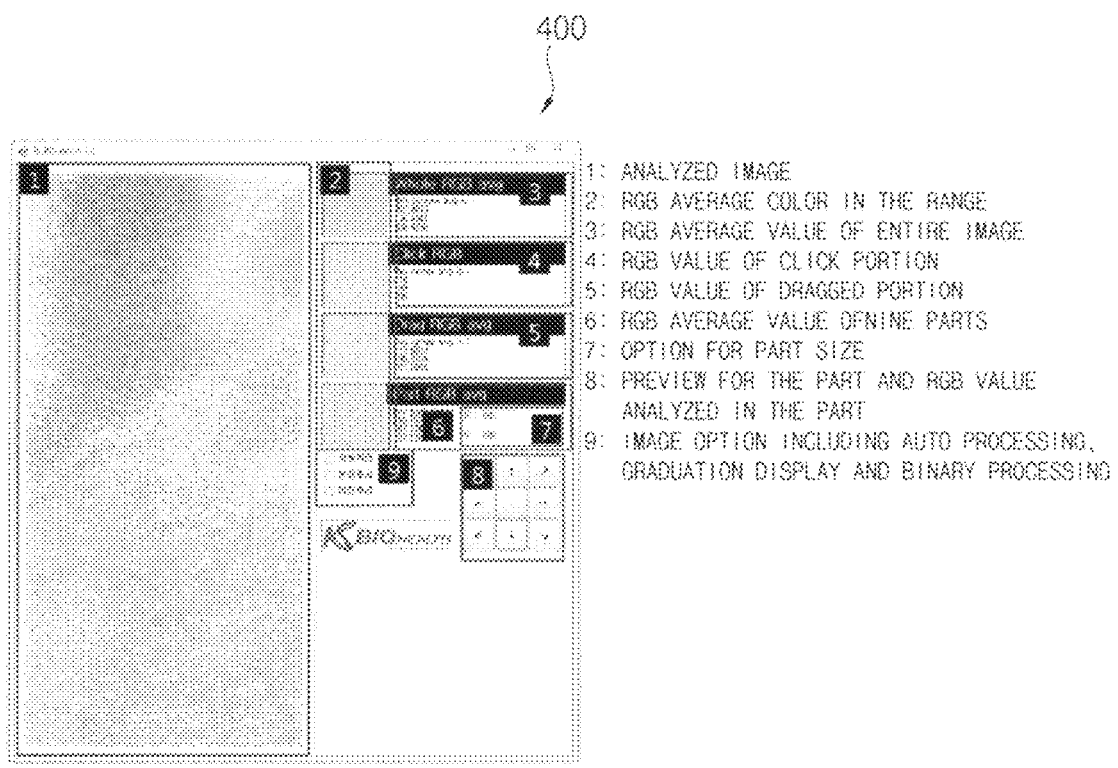
FIG. 5 is an image showing a window in analyzing the images obtained in the photographing box in FIG. 3 or the microscope in FIG. 4 using a RGB decision program.
Figure 6A:
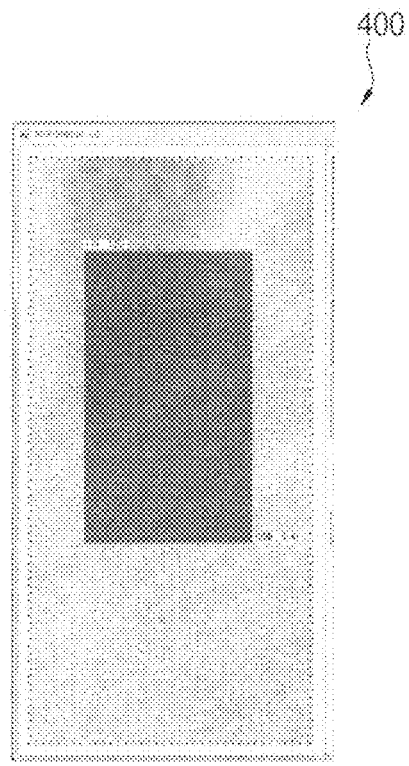
FIG. 6A is an image showing a window in which the image dragging function is performed in the RGB decision program.
Figure 6B:
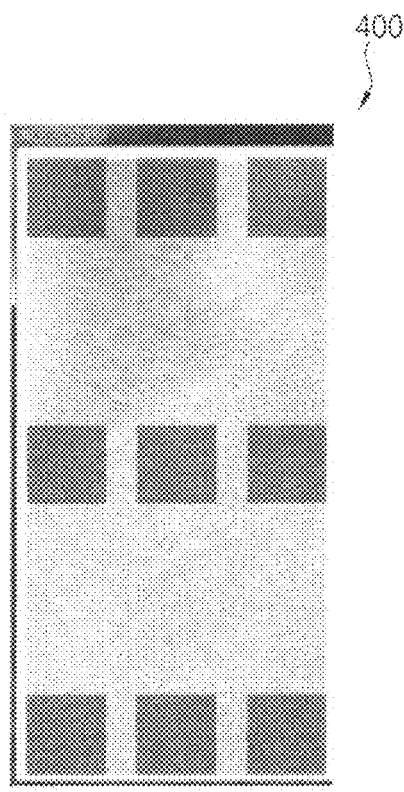
FIG. 6B is an image showing a window in which the image part function is performed in the RGB decision program.

FIG. 5 is an image showing a window in analyzing the images obtained in the photographing box in FIG. 3 or the microscope in FIG. 4 using a RGB decision program. FIG. 6A is an image showing a window in which the image dragging function is performed in the RGB decision program. FIG. 6B is an image showing a window in which the image part function is performed in the RGB decision program.

Referring to FIG. 5, the first image obtained by the photographing box 200 or the second image obtained by the microscope is analyzed using the RGB decision program.

When analyzing the first image using the RGB decision program 400, the RGB value is obtained from the first image so that the amount of discoloration of the coating paper 100 may be obtained and the amount of the moisture absorbed by the coating paper 100 may be obtained. Thus, the coating performance of the coating paper 100 may be evaluated. Here, the coating performance means completeness of the coating.

Alternatively, when analyzing the second image using the RGB decision program 400, the RGB value is obtained from the second image so that the intensity of illumination of the coating paper 100 may be obtained. Here, as the coating performance is decreases, the light transmittance increases, and as the light transmittance increases, the intensity of illumination increases. Thus, the light transmittance of the coating paper 100 may be evaluated based on the intensity of illumination of the coating paper 100, and then the coating performance may be evaluated. Here, the coating performance means completeness of the coating.

For example, when the first image or the second image (herein after, image) is analyzed by the RGB decision program 400, the RGB decision program 400 reads the images by a pixel unit, and then stores the read images with divided into R (red), G (green) and B (blue) values.

Here, as illustrated in FIG. 5, in the window of the RGB decision program 400, the image to be analyzed is displayed, and an average RGB value in a predetermined range of the image may be displayed. Here, the predetermined range of the image may be the portion selected or pre-decided within the image by a user.

In addition, in the window of the RGB decision program 400, an RGB average value of an entire image, an RGB value of a click portion of the image, an RGB value of a dragged portion of the image, may be displayed. As illustrated in FIG. 6A, when the image is dragged, the dragged portion of the image may be visually confirmed.

The image may include nine parts including an upper portion, a lower portion, a left portion, a right portion, a central portion, and each four sides of the image. Thus, the RGB decision program 400, as illustrated in FIG. 6B, may display or output an RGB average value of each of the nine parts of the image mentioned above.

Here, the user may select or preset the size of each of the nine parts of the image, and the RGB decision program 400 may provide a preview of the selected parts of the nine parts of the image, via a keypad displayed.

Further, the RGB decision program 400 has functions like a gradation function, a binary processing function and an auto processing function. Using the gradation function, the image may be displayed with 10 pixel unit. Using the binary processing function, the image is processed into white and black colors using the RGB average value of the image. Using the auto processing function, a plurality of images is processed (analyzed and stored) in series.

For example, when the user activates a checkbox of 'auto processing function', the RGB decision program 400 may analyze the images having a name of 'picture (Number, Number is an integer not less than 1)' in series, and then may store the analyzed images.

Figure 7:
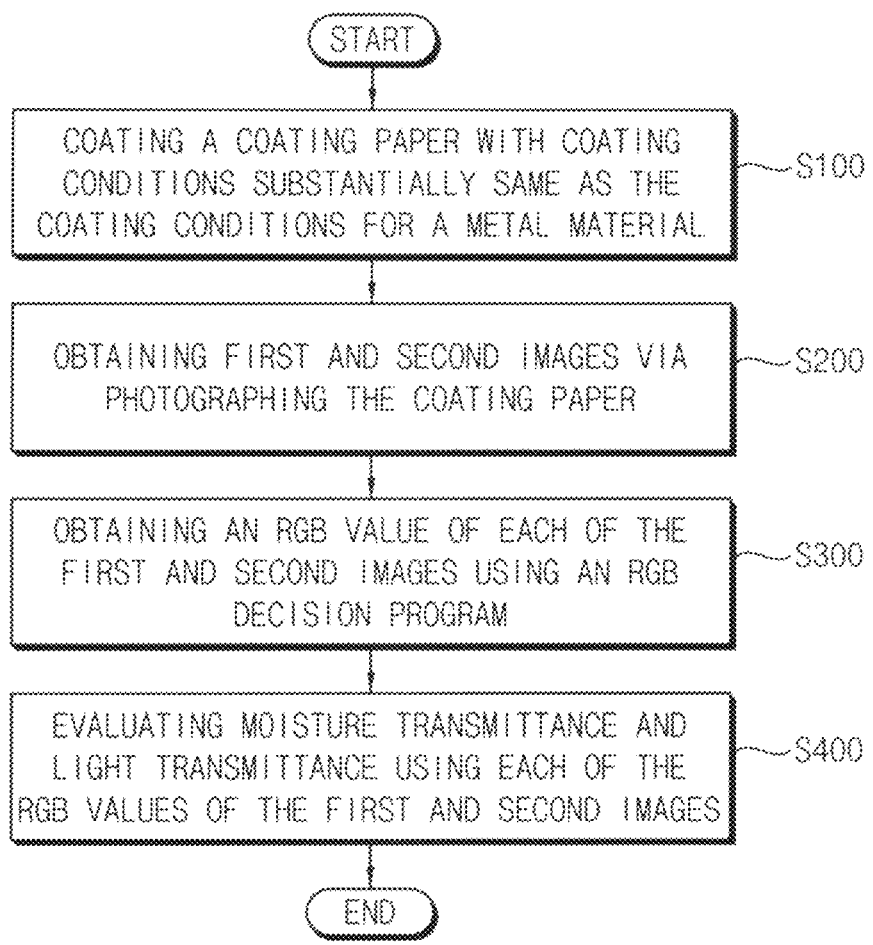
FIG. 7 is a flow chart showing a method for measuring moisture and light transmittance using the image processing-based system for measuring moisture and light transmittance of FIG. 1.

FIG. 7 is a flow chart showing a method for measuring moisture and light transmittance using the image processing-based system for measuring moisture and light transmittance of FIG. 1.

As explained above, the moisture transmittance and the light transmittance of the coating paper 100 coated with the coating material, are measured via the image processing-based system 10, and thus the coating performance of the coating material on the metal may be evaluated or estimated without actually coating the coating material on the metal.

The coating may be performed via various kinds of processes, and thus, the coating performance may be affected by coating conditions like processing steps, a processing time, a coating material, a thickness of the coating, and so on.

Thus, for every coating condition, using the image processing-based system 10, the moisture transmittance and the light transmittance are measured, so that the coating performance may be evaluated or estimated. In the method for measuring the moisture and light transmittance using the image processing-based system 10, the coating paper 100 is coated with coating conditions substantially same as the coating conditions for the metal material (step S100). Here, the coating conditions may be selected variously for evaluation or estimation.

Then, the first and second images are obtained via photographing the coating paper 100 (step S200).

Here, the first image is obtained via photographing the coating paper 100 using the photographing box 200, and the second image is obtained via photographing the coating paper 100 using the microscope 300.

After obtaining the first and second images, the first and second images are analyzed using the RGB decision program 400, and then the RGB value of each of the first and second images is obtained (step S300).

For example, when the RGB value is obtained from the first image, the coating performance is decreased as the R value in the RGB value is increased. When the coating is not properly or completely performed on the coating paper 100, the coating paper 100 absorbs the moisture and then the color of the coating paper 100 is changed from the blue into the red, so that the R value in the RGB value is increased.

In addition, when the RGB value is obtained from the second image, the coating performance is decreased as the RGB value is increased. When the coating is not properly or completely performed on the coating paper 100, the light is transmitted through the coating paper 100 more easily and thus the intensity of illumination is increased, so that the RGB value is increased.

Accordingly, the moisture transmittance and the light transmittance are evaluated from the RGB value of each of the first and second images (step S400), and thus, the coating performance may be evaluated.

According to the example embodiments mentioned above, the coating performance may be efficiently evaluated without using a relatively expensive device or a special analyzing service. The image processing-based system has a relatively simple structure, so that a cost price may be relatively low and an operating or a maintenance may be relatively easy or simple.

In addition, the coating performance may be evaluated via measuring moisture transmittance and light transmittance, so that the coating performance may be evaluated without actually coating a metal.

Having described the example embodiments of the present invention and its advantage, it is noted that various changes, substitutions and alterations can be made herein without departing from the spirit and scope of the invention as defined by appended claims.

What is claimed is:

1. An image processing-based system for measuring moisture and light transmittance for evaluating coating performance and a coating material, the image processing-based system comprising:
a cobalt chloride paper coated with a coating material with coating conditions substantially the same as used for coating the coating material on a metal for an electronic circuit;
a photographing box configured to photograph the cobalt chloride paper, to obtain a first image;
a microscope configured to photograph the cobalt chloride paper, to obtain a second image; and
an RGB decision program configured to obtaining an RGB value of each of the first and second images,
wherein moisture transmittance is evaluated using the RGB value of the first image, and light transmittance is evaluated using the RGB value of the second image.

2. The image processing-based system of claim 1, wherein the photographing box comprises:
a first box in which the cobalt chloride paper is positioned at a center thereof; and
a second box combined with the first box, and configured to photograph the cobalt chloride paper.

3. The image processing-based system of claim 2, wherein the first box comprises an LED illumination device which is disposed on at least one surface of the first box and provides an LED light,
wherein the second box comprises a photographing device disposed at a center thereof.

4. The image processing-based system of claim 1, wherein the RGB decision program reads the image by a pixel unit, and stores the read image with divided into R, G and B values.

5. The image processing-based system of claim 1, wherein the RGB decision program provides an RGB average value of an entire image, an RGB value of a click portion of the image, an RGB value of a dragged portion of the image, and an RGB average value of each of nine parts of the image including an upper portion, a lower portion, a left portion, a right portion, a central portion, and each four sides of the image.

6. The image processing-based system of claim 5, wherein the RGB decision program has functions comprising:
a gradation function displaying the image with 10 pixel unit;
a binary processing function processing the image into white and black colors using the RGB average value of the image; and
an auto processing function processing a plurality of images in series.

7. A method for measuring moisture and light transmittance, the method comprising:
coating a cobalt chloride paper with a coating material with coating conditions substantially the same as used for coating the coating material on a metal for an electronic circuit;
obtaining first and second images via photographing the cobalt chloride paper;
obtaining an RGB value of each of the first and second images using an RGB decision program; and
evaluating moisture transmittance using the RGB value of the first image and evaluating light transmittance using the RGB values of the second images.

8. The method of claim 7, wherein in obtaining the first image, the cobalt chloride paper is positioned at a center of a photographing box.

9. The method of claim 7, wherein in obtaining the second image, the cobalt chloride paper is photographed by a microscope.

* * * * *